US008588780B2

(12) United States Patent
Sebire et al.

(10) Patent No.: US 8,588,780 B2
(45) Date of Patent: Nov. 19, 2013

(54) CONNECTION RE-ESTABLISHMENT IN A COMMUNICATION SYSTEM

(75) Inventors: Benoist Pierre Sebire, Tokyo (JP); Lars Dalsgaard, Oulu (FI); Jarkko T. Koskela, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/378,794

(22) PCT Filed: Jun. 16, 2009

(86) PCT No.: PCT/EP2009/057491
§ 371 (c)(1),
(2), (4) Date: Feb. 14, 2012

(87) PCT Pub. No.: WO2010/145697
PCT Pub. Date: Dec. 23, 2010

(65) Prior Publication Data
US 2012/0135736 A1    May 31, 2012

(51) Int. Cl.
*H04W 36/00* (2009.01)
(52) U.S. Cl.
USPC .......................................................... 455/436
(58) Field of Classification Search
USPC ................................................. 455/436–448
See application file for complete search history.

(56) References Cited

U.S. PATENT DOCUMENTS

| 2006/0209798 A1 | 9/2006 | Oikarinen et al. | 370/352 |
| 2009/0086676 A1* | 4/2009 | Meylan et al. | 370/331 |
| 2009/0316655 A1* | 12/2009 | Prakash et al. | 370/331 |

FOREIGN PATENT DOCUMENTS

| EP | 2 028 890 A1 | 2/2009 |
| WO | WO 2008/113373 A1 | 9/2008 |
| WO | WO 2009/155576 A1 | 12/2009 |

OTHER PUBLICATIONS

3GPP TS 36.331 V8.5.0 (Mar. 2009), Technical Specification, 3rd Generation Partnership Project; Technical Specification Group Radio Access Network; Evolved Universal Terrestrial Radio Access (E-UTRA) Radio Resource Control (RRC); Protocol Specification (Release 8), (204 pages).
3GGPP TS 36.304 V8.5.0 (Mar. 2009), Technical Specification, 3rd Generation Partnership Project; Technical Specification Group Radio Access Network; Evolved Universal Terrestrial Radio Access (E-UTRA); User Equipment (UE) Procedures in Idle Mode (Release 8), (30 pages).

* cited by examiner

*Primary Examiner* — Temica M Beamer
*Assistant Examiner* — Joel Ajayi
(74) *Attorney, Agent, or Firm* — Harrington & Smith

(57) ABSTRACT

A method is disclosed where information is sent to at least one mobile device in a connected mode first system. The information is indicative that a deliberate connection re-establishment is to be used to access at least one second system at least in certain situations when the at least one mobile device is in connected mode. The mobile device in the first system can process the information, and based on the processing, initiate a deliberate connection re-establishment procedure to access a second system.

33 Claims, 6 Drawing Sheets

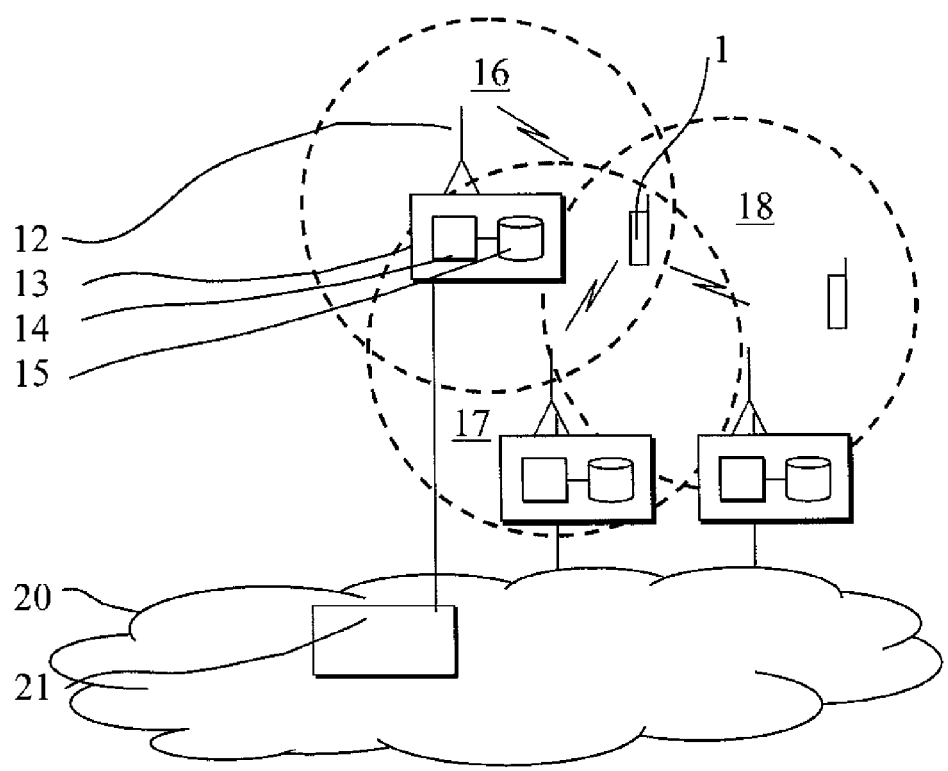
Fig. 1
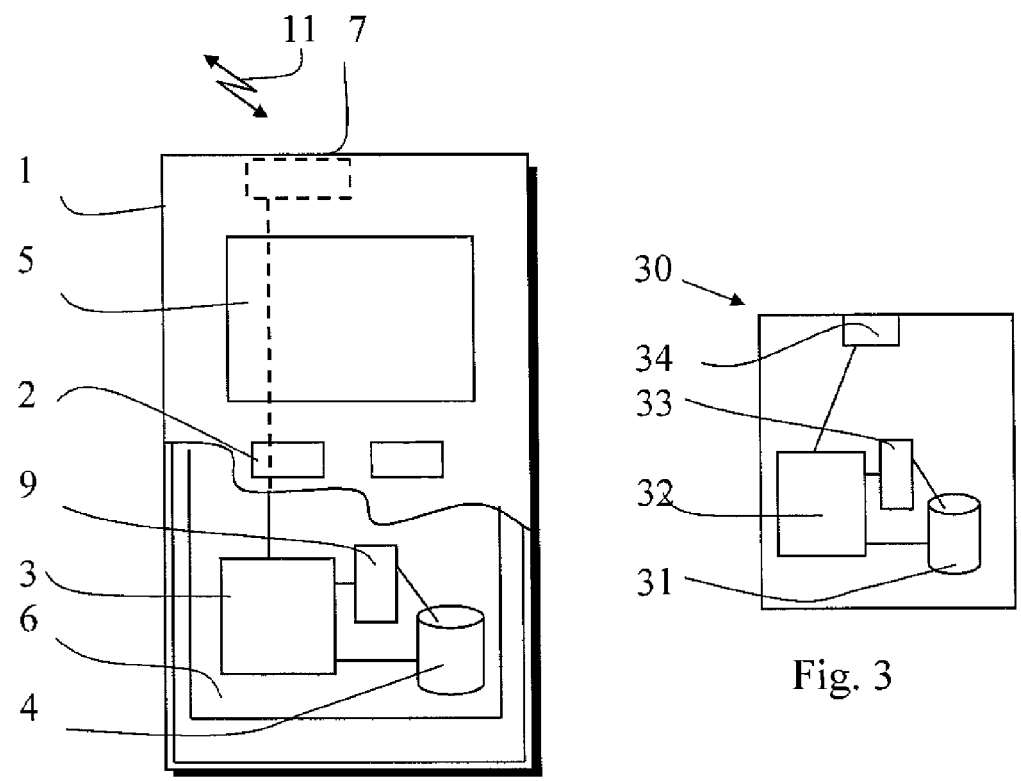
Fig. 2
Fig. 3

CONNECTION RE-ESTABLISHMENT IN A COMMUNICATION SYSTEM

The invention relates to re-establishment of connections in a communication system, and more particularly to connection re-establishment for a mobile device that is in connected mode.

A communication system can be seen as a facility that enables communication sessions between two or more entities such as mobile communication devices, base stations and/or other communication points. A communication system and compatible communicating entities typically operate in accordance with a given standard or specification which sets out what the various entities associated with the system are permitted to do and how that should be achieved. For example, the standards, specification and protocols can define the manner how and based on which access technology communication devices can access the communication system and how communication shall be implemented between communicating devices, the elements of a communication network and/or other communication devices.

In a wireless communication system at least a part of the communication between at least two stations occurs over a wireless link. Wireless mobile systems are typically divided into cells, and are therefore often referred to as cellular systems. In cellular systems a cell provides an access system for a mobile device. A mobile device can move from a cell to other, and thus mobility between the access systems is provided. Examples of wireless systems providing mobility for the users thereof include public land mobile networks (PLMN), satellite based communication systems and different wireless local networks, for example wireless local area networks (WLAN).

A user can access the communication system by means of an appropriate communication device. A communication device of a user is often referred to as user equipment (UE) or user terminal. A communication device is provided with an appropriate signal receiving and transmitting arrangement for enabling communications with other parties. Typically a communication device is used for enabling the users thereof to receive and transmit communications such as speech and data. In wireless systems a communication device provides a transceiver station that can communicate with for example a base station of an access network providing at least one cell and/or another communications device. Depending on the context, a communication device may also be considered as being a part of a communication system. In certain applications, for example in adhoc networks, the communication system can be based on use of a plurality of user equipment capable of communicating with each other.

An example of communications systems is an architecture that is being standardized by the $3^{rd}$ Generation Partnership Project (3GPP) is the long-term evolution (LTE) of the Universal Mobile Telecommunications System (UMTS). A further development of the LTE is often referred to as LTE-Advanced. The LTE employs a mobile access architecture known as the Evolved Universal Terrestrial Radio Access Network (E-UTRAN). Other examples of radio access systems include those provided by base stations of access systems that are based on technologies such as wireless local area network (WLAN) and/or WiMax (Worldwide Interoperability for Microwave Access).

The mobility of mobile devices can be controlled by the communication system, typically by the access network that is currently serving the mobile device. For example, the radio resource control (RRC) connected mode of E-UTRAN provides network controlled mobility for the mobile devices. The mobility is provided based on assistance from the mobile device. To provide this, the mobile device can make measurements and report these to the network, typically to a base station of the currently serving or source access system. A mobile device can measure and report neighbouring cells to the source cell. The source cell can then decide based on a predetermined criterion that a handover of the mobile device connected thereto to another cell is required. The source cell can then select a target cell, can prepare the target cell to accept the mobile device (handover preparation) and command the mobile device to handover to that cell (handover execution).

Problems may occur in handover for example when radio conditions are not always good enough to ensure that the mobile device can receive a handover command. A procedure that can be used to mitigate this is known as connection re-establishment. In connection re-establishment the connection can be re-established between the mobile device and a cell provided that the cell obtains the necessary information, for example user equipment (UE) context (e.g. through handover preparation) without the mobile device having received the handover command (handover execution). The connection re-establishment procedure can be triggered for example by detection of a failure, for example a radio link failure (RLF). Appropriate monitoring criteria can be defined to monitor for the quality of the radio link and to detect the occurrence of a radio link failure. For example, the reception of a given number of "out-of-sync" indications from lower layers can be used to trigger a timer, expiry of which can be used as an indication of a radio link failure. The expiry can be used to trigger initiation of a connection re-establishment procedure at the mobile device. In the currently defined re-establishment procedure, the re-establishment thus takes place only after the reception of the predefined number of "out-of-sync" indications and the expiry of the tinier. This procedure can increase interruption time. This can be undesirable in certain handover situations.

It is noted that the above discusses only examples, and the issues are not limited to any particular communication environment, standard, specification and so forth, but may occur in any appropriate communication system where connection re-establishment is possible.

Embodiments of the invention aim to address one or several of the above issues.

In accordance with an embodiment there is provided a method comprising sending to at least one mobile device in a first system information indicative that a deliberate connection re-establishment is to be used to access at least one second system at least in certain situations when the at least one mobile device is in connected mode.

In accordance with another embodiment, there is provided a method, comprising processing at a mobile device in a connected mode in a first system information indicative that a deliberate connection re-establishment is to be used at least in certain situations, and based on the processing, initiating a deliberate connection re-establishment procedure to access a second system.

In accordance with another embodiment, there is provided an apparatus comprising at least one processor and at least one memory including computer program code, the at least one memory and the computer program code configured to, with the at least one processor, cause the apparatus at least to send to at least one mobile device in a first system information indicative that a deliberate connection re-establishment is to be used to access at least one second system at least in certain situations when the at least one mobile device is in connected mode in the first system.

A yet another embodiment provides an apparatus comprising at least one processor and at least one memory including computer program code, the at least one memory and the computer program code configured to, with the at least one processor, cause the apparatus at least to process information indicative that at least in certain situations a deliberate connection re-establishment is to be used by a mobile device in connected mode in a first system, and based on the processing, initiate a deliberate connection re-establishment procedure to access a second system.

In accordance with more detailed embodiment the information is received from the first system. No target system, or not all target systems, may be identifiable from signalling from the first system. A target system may be selected by the mobile device.

The information may be communicated to the mobile device in dedicated signalling. The dedicated signalling may comprise a command for deliberate connection re-establishment in the at least one second system. At least a part of the information may be signalled to the mobile device by a broadcast. At least a part of the information may be signalled in a radio resource control (RRC) message.

The first system may be configured to determine whether a deliberate connection re-establishment is desired instead of handover.

The information may comprise an indication of a set of cells where deliberate re-establishment procedure can be used. The mobile device may be provided with information regarding a set of cells and thereafter receive an indication of a target cell. The mobile device may then determine that the target cell belongs to the set of cell and perform a deliberate connection re-establishment in the target cell belonging to the set of cells. The providing of the mobile device with information may comprise signalling from a serving cell instructions to the mobile device that when accessing a cell in the set of cells deliberate connection re-establishment shall be used.

Instructed re-establishment to access a new access system may be performed only if a predefined security function is activated and/or a restriction check is not prohibitive.

A computer program comprising program code means adapted to perform one or more of the herein disclosed methods can also be provided.

Various other aspects and further embodiments are also described in the following detailed description of examples embodying the invention and in the attached claims.

The invention will now be described in further detail, by way of example only, with reference to the following examples and accompanying drawings, in which:

FIG. 1 shows an example of a communication system wherein below described examples of the invention may be implemented;

FIG. 2 shows an example of a communication device;

FIG. 3 shows an example of a controller for a base station;

Figure 4:
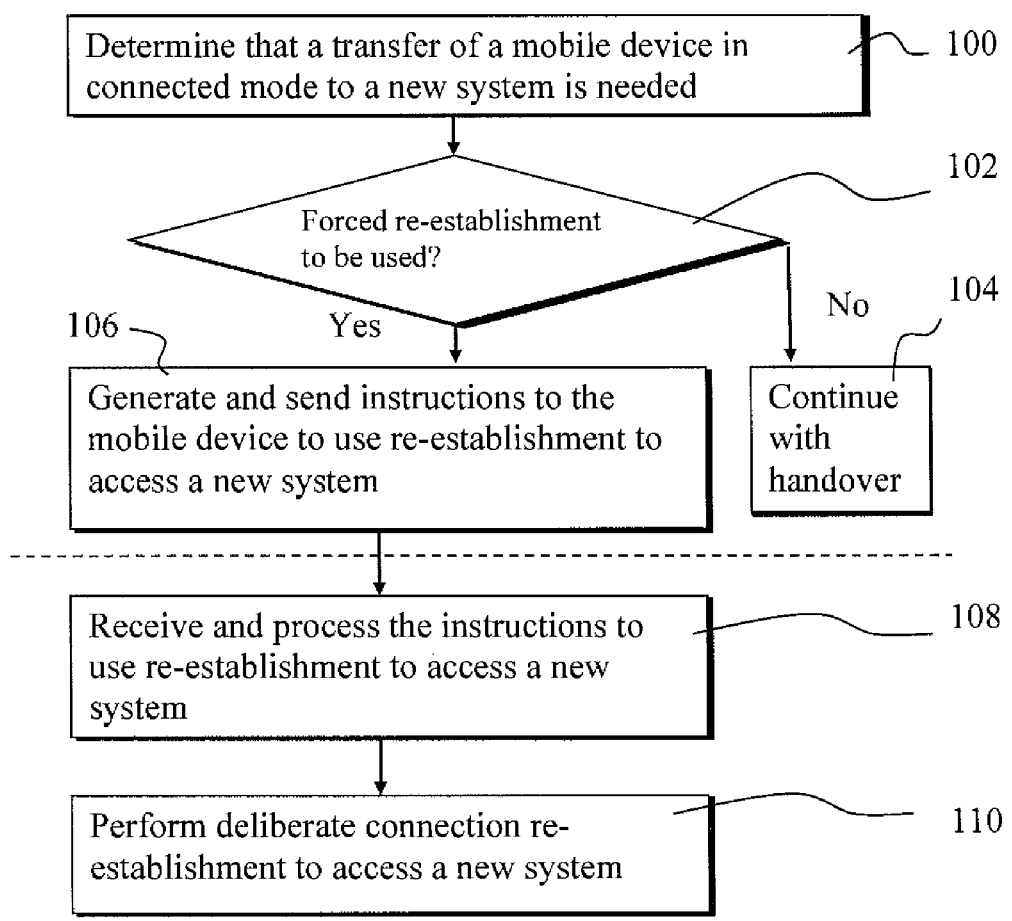
FIG. 4 is a flowchart illustrating an embodiment.

In the following certain exemplifying embodiments are explained with reference to a wireless or mobile communication system serving mobile communication devices. Before explaining in detail the certain exemplifying embodiments, certain general principles of a mobile communication system and mobile communication devices are briefly explained with reference to FIGS. 1 and 2 to assist in understanding the technology underlying the described examples.

A mobile communication device 1 can be used for accessing various services and/or applications. The communication device may provide, for example, communication of data for carrying communications such as voice, electronic mail (email), text message, multimedia and so on. Users of mobile communication devices, which often are referred to as mobile user equipment, may thus be offered and provided numerous services via their communication devices. Non-limiting examples of these services include two-way or multi-way calls, data communication or multimedia services or simply an access to a data communications network system, such as the Internet. User may also be provided broadcast or multicast content. Non-limiting examples of the content include downloads, television and radio programs, videos, advertisements, various alerts and other information.

A mobile communication device 1 is typically provided wireless access via at least one base station 12 or similar wireless transmitter and/or receiver node of a radio access network or the like. The different network and/or station systems providing mobile access are referred to in the following as an access system. Each mobile communication device and base station may have one or more radio channels open at the same time and may send and/or receive signals from more than one source.

In FIG. 1 three access systems 16, 17 and 18 are shown. However, it is noted that this is only to illustrate that a plurality of access systems can be provided and that instead of three access systems, any number of access systems may be provided in a communication system. An access system may be provided by a cell of a cellular system or another system enabling a communication device to access a communication system. A base station site 12 can provide one or more cells of the plurality of cells of a cellular system. A base station can be configured to provide an omnidirectional cell, but a base station can also provide, for example, three sectors, each sector providing a cell.

The cell borders or edges are schematically shown by the dashed lines in FIG. 1. It shall be understood that the sizes and shapes of the cells may vary considerably from the similarly sized omnidirectional cells of FIG. 1. The cell areas typically overlap. As shown, the mobile device 1 may thus communicate with a plurality of access systems 16, 17 and 18. The mobile device may also move from a cell to another cell, or more generally speaking, from access system to another. This is known as handover. In the following a cell from which the mobile is to be handed over is referred to as serving or source cell and the new cell is to be referred to as target cell.

A base station 12 is typically controlled by at least one appropriate controller so as to enable operation thereof and management of mobile communication devices in communication with the communication system. The base station control apparatus can take part in handover control. The control apparatus can be interconnected with other control entities. In FIG. 1 the control apparatus is shown to be provided by block 13. A base station control apparatus is typically provided with at least one memory 15 and at least one data processor 14. It shall be understood that the control apparatus and functions may be distributed between a plurality of control units.

The communication devices 1 can be provided with radio access based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication systems is the long-term evolution (LTE) of the Universal Mobile Telecommunications System (UMTS) that is being standardized by the 3$^{rd}$ Generation Partnership Project (3GPP). As explained above, further development of the LTE is referred to as LTE-Advanced. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the mobile devices. Other examples of access systems include those provided by base stations of systems that are based on technologies such as wireless local area network (WLAN) and/or WiMax (Worldwide Interoperability for Microwave Access).

In FIG. 1 example the base stations are connected to a wider communications network 20. A controller 21 may be provided in the network 20 for coordinating the operation of the access systems. Although not shown, a gateway function may also be provided to connect to another network via the network 20. The other network may be any appropriate network, for example another communication network, a packet data network and so on. A communication system may thus be provided by one or more interconnect networks and the elements thereof, and one or more gateways may be provided for interconnecting various networks.

FIG. 2 shows a schematic, partially sectioned view of a mobile device 1 that a user can use for communication with a communication system. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device 1 may receive signals over an air interface 11 via appropriate apparatus for receiving and may transmit signals via appropriate apparatus for transmitting radio signals. In FIG. 2 a transceiver is designated schematically by block 7. The transceiver may be provided for example by means of a radio part and associated antenna arrangement. The antenna arrangement may be arranged internally or externally to the mobile device.

A mobile device is also typically provided with at least one data processing entity 3, at least one memory 4 and other possible components 9 for use in software aided execution of tasks it is designed to perform, including control of access to and communications with access systems and other communication devices. The data processing, storage and other relevant control apparatus can be provided on an appropriate circuit board and/or in chipsets. This feature is denoted by reference 6. The control apparatus can be configured to cause execution of tasks that relate to mobility, such as measurements, cell section, connection re-establishment and handovers. Thus, in accordance with an example, a determination can be made by the control apparatus if connection re-establishment shall be performed. The control apparatus may then cause transmission of required signalling to one or more other stations in response to such determination.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

FIG. 3 shows an example of a control apparatus 30 for an access system, for example to be coupled to a base station of an access system. The control apparatus 30 can be arranged to provide control on mobile communication devices that are in the area of the access system. The control apparatus 30 can be configured to cause triggering of connection re-establishment in one or more mobile devices within the relevant area. For this purpose the control apparatus comprises at least one memory 31, at least one data processing unit 32, 33 and an input/output interface 34. Via the interface the control apparatus can be coupled to a receiver and a transmitter of an access system, for example a base station antenna, so that it can receive/transmit information signals from/to the communication device. The control apparatus 30 can be configured to execute an appropriate software code to provide the control functions and cause execution of operations as explained below in more detail.

In the following certain exemplifying embodiments illustrate in more detail how it is possible to reduce interruption delay in a connection when transferring a mobile device that is in a connected mode to a new access system. In the examples a deliberate re-establishment procedure is used when the mobile device accesses the new system, In accordance with an embodiment, one or more mobile devices 1 are in a first system 16 in connected mode. The control apparatus 13 of the first system causes the base station 12 of the system to send to the at least one mobile device in the connected mode information that is indicative that a deliberate connection re-establishment is to be used when accessing at least one second system, for example one of the systems 17 or 18 in FIG. 1. Examples of appropriate decision making and signalling procedures for this will be given below. The processing apparatus of the mobile device 1 may then process said information, and based on the processing, the apparatus may cause initiation of a deliberate connection re-establishment procedure to access a second system, for example one of the systems 17 or 18 in FIG. 1.

In accordance with a more detailed example shown in FIG. 4, the procedure may be started when a base station of a serving access system receives measurement results from a mobile device and a control apparatus thereof determines at 100 that transfer of the mobile device connected thereto to another base station is needed. The decision may be made, for example, because the quality of the current radio link is no longer on an acceptable level.

Based on predetermined criteria and rules, the access system currently serving the mobile device can then decide at 102 that connection re-establishment is desired to be used for the transfer. For example, the access system can decide to ask the mobile device to use re-establishment procedure if the access system cannot reliably determine the identity of the potential target access system based on information in the measurement report, and/or if there is any confusion in the identity and/or if the communication system is using or experiencing uncoordinated deployment.

Instead of using universal rules, the rules and algorithms for the decision making can be access system dependent. For example, the triggering criteria can depend on the environment and characteristics of the neighbouring access systems.

If the decision is that there is no need for the re-establishment, normal handover will follow at 104. However, if re-establishment is desired, then the access system can generate and send at 106 to the mobile device instructions to use re-establishment.

The mobile device then receives and processes the instructions from the access system at 108. If it determined that a deliberate re-establishment is required, the mobile device can proceed accordingly at 110. For example, the mobile device can detach from the source cell, perform cell (re)selection if needed, select a new cell if needed, and attempt to re-establish the connection. The new cell can inform the mobile device whether re-establishment is successful or not.

The access systems can be any appropriate access systems. An appropriate network element and more particularly a control apparatus associated with an access system can order the re-establishment in connection with handover mobility. The instructions can indicate none, one or more potential target systems.

Figure 5A:
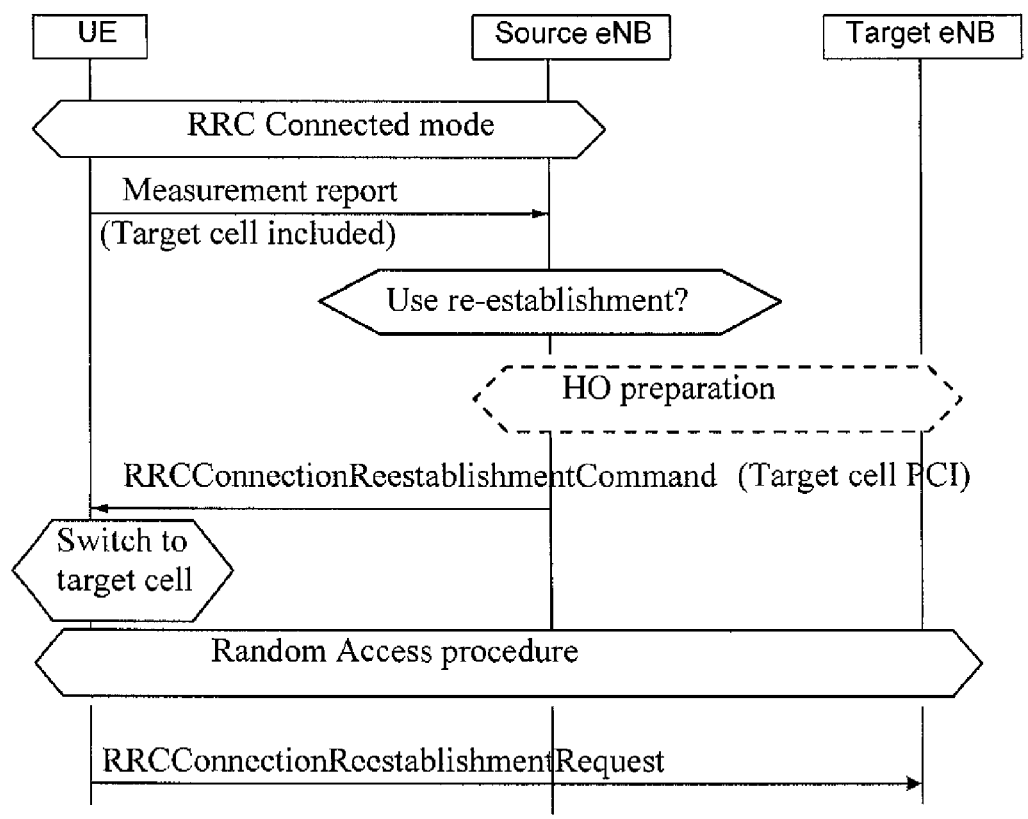
FIGS. 5 to 7 show signalling flows for certain embodiments.
Figure 5B:
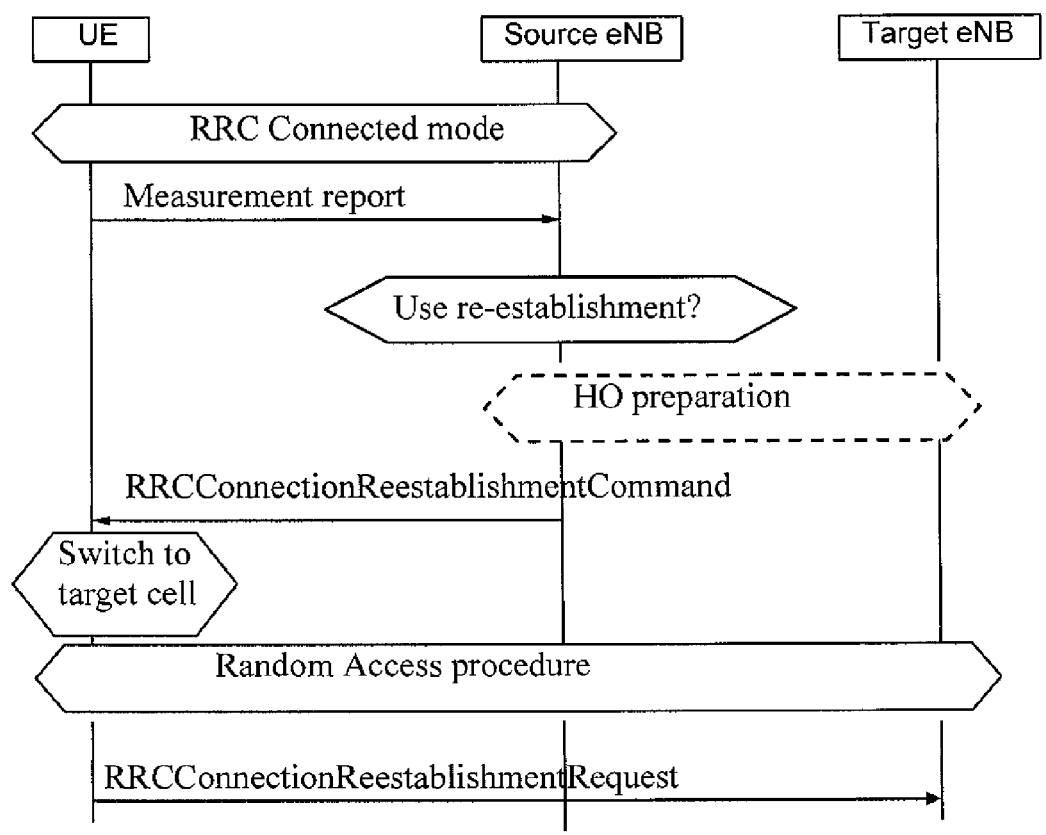
Figure 6:
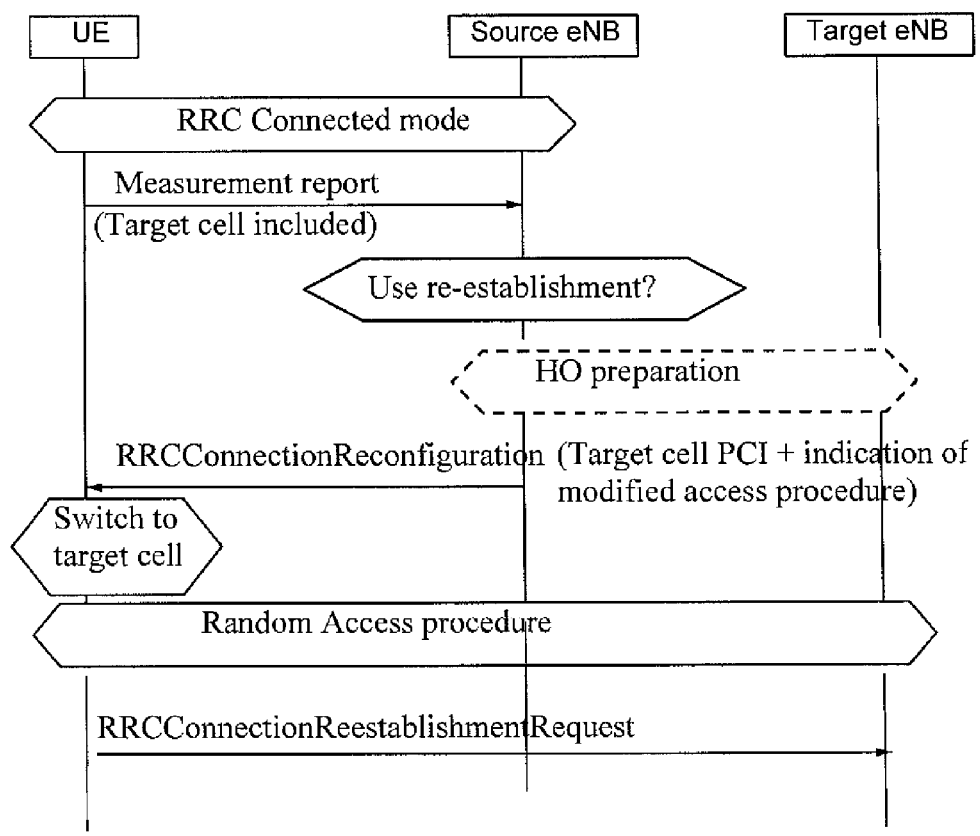
Figure 7:
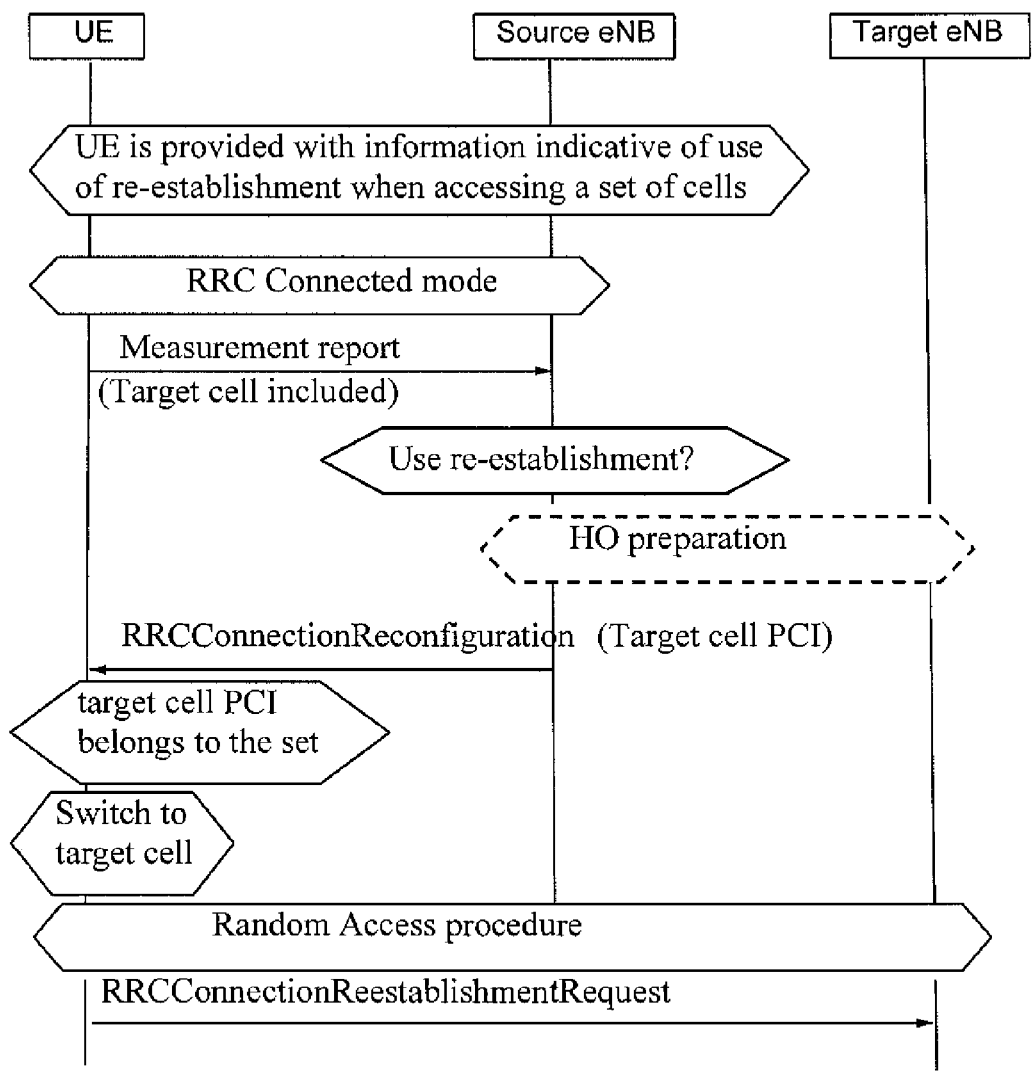

The following describes non-limiting examples with reference to FIGS. 5 to 7 certain examples how a deliberate or forced re-establishment procedure can be provided with reference to mobile devices such as 3GPP user equipment (UE) and access systems. The access systems can be based on cells provided by means of eNBs operating in the 3GPP E-UTRAN environment.

In the 3GPP re-establishment procedure in accessing a cell is currently only possible if a certain set of triggers are met. These are described in details in 3GPP TS 36.331 version 8.5.0 of March 2009, sections 5.3.7.1 and 5.3.7.2. The triggers include detection of a radio link failure (RLF). Other triggering conditions are also defined, and thus re-establishment can be triggered by other failures such as handover failure, mobility failure, integrity check failure or connection reconfiguration failure. A predefined criteria can be defined to monitor the quality of the radio link and to detect the occurrence of a radio link failure. For example, in accordance with the above referenced 3GPP TS 36.331, the reception of a given number (N=310) of "out-of-sync" consecutive indications from lower layers triggers a timer to be started (T310). Once this timer expires, a radio link failure is detected and the user equipment initiates a connection re-establishment procedure. The connection re-establishment procedure can be provided such that the user equipment selects a new cell and transmits an RRCConnectionReestablishmentRequest to the new, or target cell. The new cell can then either accept the re-establishment attempt or reject it. For example, an answer with RRCConnectionReestablishment can be used as a means for communicating an acceptance. Rejection can be communicated with a RRCConnectionReestablishmentReject message.

In accordance with embodiments shown in FIGS. 5A and 5B, a source cell/eNB can force the mobile user equipment to start a re-establishment procedure by means of a specific command. A user equipment (UE) in a RRC connected mode can send a measurement report to the source eNB. Although not always necessary, the measurement report can include results for at least one possible target cell in both examples. A controller of the source cell may then process the report from the user equipment, and possibly from one or more other user equipment, to decide if transfer is needed. The controller can decide to use re-establishment procedure, and can instruct the user equipment accordingly.

FIGS. 5A and B show within the dashed line the possibility of the source cell initiating handover preparation with the target cell. However, it may be that this is not possible, for example because a potential target cell is not uniquely identifiable, or that the source cell control apparatus cannot be certain that the preparation can be completed successfully. Therefore, instead of taking the handover route, a decision is made to order re-establishment by the user equipment.

In accordance with the examples of FIGS. 5A and 5B a source eNB can then specifically instruct the user equipment to perform the re-establishment by means of dedicated signalling. A new radio resource control (RRC) message can be introduced to provide the functionality. More particularly, in the examples a message named 'RRCConnectionReestablishmentCommand' is sent from the source eNB to the user equipment. The message commands the user equipment to initiate a re-establishment procedure without having to wait for the predefined number of consecutive "out-of-sync" indications from the lower layers and the expiry of the timer. Thus the re-establishment procedure can be initiated earlier than it would otherwise.

The command message may or may not include the identity of one or more potential target cells. Upon reception of the command the user equipment can initiate a procedure to switch to a target cell. At this point the user equipment can take various actions. The step of switching may include steps such as selecting and evaluating the possible cell or cells for possible access restrictions. Action than may be required can be specified in the relevant standard. For example, in the E-UTRAN, at least some of the following control operations may be provided: stop timer T310, if this is running, start timer T311, suspend all radio bearers (RBs) except signalling radio bearer 0 (SRB0), reset media access control (MAC), apply the default physical channel configuration, apply the default semi-persistent scheduling configuration, and apply the default media access control (MAC) main configuration.

FIG. 5A shows a scenario where at least one target cell identity is included in the command message. Upon receipt of the command, the user equipment can start with access to the identified target cell. At this stage the user equipment can take various actions such as check for any access restrictions. The access may be provided based on a random access procure and a request for re-establishment with the cell.

It is noted that whereas FIG. 5A shows an instruction message that contains at least one potential target cell identity (PCI), this is not necessary. FIG. 5B shows an embodiment where the command message does not contain any indications of any potential target cells. In accordance with a possibility indication of only a few, but not all of the potential cells are included. If the target cell identity is not provided in the message, or there is some unclarity in view of the target cell identity, a target cell can be selected by the user equipment. The user equipment may employ appropriate cell selection or re-selection procedure for this purpose. The cell selection or re-selection may be provided in accordance with the specifications by 3GPP TS 36.304, version 8.5.0, of March 2009. Using an existing cell (re-)selection such as the one already defined for the procedure in 3GPP specifications takes potential non-accessible cells into account.

In accordance with a possibility, when the user equipment has received the command to change the cell and uses re-establishement procedure in a possibly indicated cell, the reselection/selection and access check (prior to actually accessing the cell) is not restricted only to cases where the user equipment chooses the target cell. The access restriction check can also be applied even if the source eNB indicates a specific target cell in the modified handover command (the modified RRCConnectionReconfiguration message or similar).

The user equipment is not necessarily even aware of whether the network can identify the potential target cell in a reliable manner or not. This possible problem can be addressed by defining clear rules how to proceed. The rules can be defined and maintained at the network, for example at a controller of the serving/source base station. The source base station may then specifically instruct the user equipment accordingly by means of the dedicated signalling in connection with a mobility decision. The rules can be implementation specific.

Once the target cell is selected, the random access procedure follows where the user equipment sends a connection re-establishment request to the target cell.

FIG. 6 illustrates an approach where an appropriate modified radio resource control (RRC) message is used instead of a specific command. For example, it is possible to modify the shown RRCConnectionReconfiguration message that is normally used for handover command in such a way that it can be used also for triggering a radio link failure (RFL). For example, some normally mandatory fields, like target cell information, may be omitted from the message and/or some additional information, for example a bit indicating re-establishment procedure may be added to the message. In accordance with an embodiment a deliberately left out mandatory field in a handover command triggers the user equipment to use re-establishment procedure in the target instead of a handover procedure. In the embodiment shown in FIG. 6 the RRC message associated with the mobility procedure is modified to include instructions for the user equipment to use connection re-establishment procedure. It is noted that it is not necessary to include any target cell identity information, or identities of all potential target cells into this message.

The above described embodiments can be implemented in the framework of the current 3GPP specifications by modifying certain sections thereof such that a user equipment in the RRC connected state is enabled to initiate the procedure in order to continue the RRC connection. The user equipment can initiate the re-establishment procedure immediately upon reception for example of the RRCConnectionReestablishmentCommand or other instructions. If the E-UTRAN accepts the re-establishment, signalling radio bearer 1 (SRB1) operation resumes while the operation of other radio bearers remains suspended.

In accordance with an embodiment, for enhanced security, the procedure is only allowed if Access Stratum (AS) or similar security function has been activated. If a security function has not been activated the user equipment does not initiate the procedure. Instead, the user equipment can move to idle state directly.

FIG. 7 shows an embodiment where the source eNB indicates that the user equipment shall use re-establishment procedure to a given set of target cells. The indication can be broadcast to all user equipment in a predefined area. The indication can also be sent in dedicated messaging to one or more user equipment in an area. The serving eNB can broadcast in a system information block (SIB) if handover to specific cells, for example closed subscriber group (CSG) cells, is to use re-establishment procedure in the target cell or not. The information if forced re-establishment is to be used can be communicated based on RRC messages, for example RRCConnectionReconfiguration messages or similar.

If the source eNB decides that re-establishment shall be used when accessing a cell, it can send an appropriate indication of the cell to the user equipment. For example, it can include the identity of the target cell in a RRC connection reconfiguration message. The user equipment will then check if the identity belongs to the set of cells it received earlier. For example, the user equipment can determine if the physical cell identity (PCI) of the cell is within a set or range of PCI's communicated thereto earlier and stored in the memory thereof.

However, It is again noted that it is not necessary to include any target cell identity information, or identities of all potential target cells into the message instructing use of deliberate re-establishment in this scenario either.

According to a possibility it can be specified in a relevant standard and/or technical specification, or the definitions of a network element can be otherwise such that when a connection is transferred to specific cells or frequency or frequency band(s), then the mobile device uses, as a default, re-establishment procedure when accessing a target system. The mobile device itself may be defaulted this way, or the system the mobile device is connected to can as a default sent appropriate instructions to this effect. For example, this can be made a default procedure in handover to closed subscriber group (CSG) cells identified by having a physical cell identity (PCI) inside a reserved range of PCIs for the CSG cells and/or for frequencies dedicated for CSG usage.

The re-establishment procedure can be contemplated to be used for various other mobility cases than the one mentioned above. Therefore the use is not limited to 3GPP mobile systems, as a general example and without going into the practical details. For example, mobility in networks deployed using uncoordinated network deployment may benefit from a forced re-establishment procedure.

The required data processing apparatus and functions to cause a base station apparatus or other network apparatus and/or an appropriate mobile device to perform the functions described above may be provided by means of one or more data processors. The execution of the control tasks and/or other functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example for including appropriate carrier indications in a processor apparatus 13 associated with the base station 12 shown in FIG. 1 and/or for the described detecting and selection operations in a data processing apparatus 3, 4 and 9 of the mobile communication device 1 of FIG. 2. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to access systems such as E-UTRAN radio access networks, similar principles can be applied to any other system where connection re-establishment can be provided for mobile devices in connected mode, for example in transfer of a connection from an access system to another access system. For example, two radio access systems may be provided by base stations of different local area networks. Also, instead of a base station an access system can be provided by another station, for example by a communication device such as a mobile station. For example, this may be the case in application where no fixed stations are provided but a communication system is provided by means of a plurality of mobile devices, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted that although the above described a few embodiments where a single mobile device was instructed to behave in a certain manner, a plurality of mobile devices within a first access system and/or to be transferred to a second access system can be instructed in a substantially identical manner. Also, measurement results from a mobile device and/or another analysis performed in view of a mobile device can be used to determine if at least one other mobile device should be instructed to perform deliberate re-establishment. For example, measurement information from a mobile device can be indicative that a serious failure has taken place in a cell and thus all devices in that cell need to be transferred, and that there is likelihood for link errors in that situations that can be mitigated by forcing a connection re-establishment in a new cell or cells. Thus the re-establishment can be instructed even in situations where a plurality of mobile devices are transferred to a plurality of cells.

It is also noted herein that while the above describes exemplifying embodiments of the invention, there are several variations and modifications which may be made to the disclosed solution without departing from the spirit and scope of the present invention, as defined in the appended claims.

The invention claimed is:

1. A method, comprising:
   in a wireless communication system configured to perform a connection re-establishment procedure that is initiated by a mobile device upon an occurrence of at least one of a plurality of predefined trigger conditions, where one of the predefined trigger conditions is a detection by the mobile device of a radio link failure, making a decision at a control apparatus of a first access system that a deliberate connection re-establishment procedure is to be performed by a mobile device in the first access system to transfer the mobile device to another base station, where the mobile device is in connected mode in the first access system; and
   sending from a base station of the first access system to the mobile device information indicative that a deliberate connection re-establishment is to be used to access at least one second access system, where
   the decision is made and the information is sent to the mobile device that in response initiates the connection re-establishment procedure regardless of the status of any of the predefined trigger conditions.

2. A method, comprising:
   in a wireless communication system configured to perform a connection re-establishment procedure that is initiated by a mobile device upon an occurrence of at least one of a plurality of predefined trigger conditions, where one of the predefined trigger conditions is a detection by the mobile device of a radio link failure, receiving at a mobile device, from a control apparatus of a first access system, information indicative that a deliberate connection re-establishment is to be used to transfer the mobile device to another base station, the information being received at the mobile device via a base station of the first access system when the mobile device is in a connected mode in the access first system; and
   processing at the mobile device the received information and based on the processing, initiating a deliberate connection re-establishment procedure to access a second access system, where
   the information is received and processed at the mobile device that in response initiates the connection re-establishment procedure regardless of the status of any of the predefined trigger conditions.

3. A method as claimed in claim 1, wherein no target system is identifiable from signalling from the first system.

4. A method as claimed in claim 2, comprising selection of a target system by the mobile device.

5. A method as claimed in claim 1, wherein a target system identifier is included in signalling from the first system.

6. A method as claimed in claim 5, wherein the target system identifier comprises at least one physical cell identity.

7. A method as claimed in claim 1, comprising communicating said information to the mobile device in dedicated signalling.

8. A method as claimed in claim 7, wherein the dedicated signalling comprises a command for deliberate connection re-establishment in the at least one second system.

9. A method as claimed in claim 1, comprising signalling at least a part of the information to the mobile device by a broadcast.

10. A method as claimed in claim 1, comprising determining in the first system whether a deliberate connection re-establishment is desired instead of handover.

11. A method as claimed in claim 1, wherein at least a part of the information is signalled in a radio resource control (RRC) message.

12. A method as claimed in claim 1, wherein said information is generated by a serving base station.

13. A method as claimed in claim 1, wherein the information comprises an indication of a set of cells where the deliberate re-establishment procedure can be used.

14. A method as claimed in claim 2, where the received information comprises information regarding a set of cells; and further comprising receiving an indication of a target cell; determining that the target cell belongs to the set of cells; and performing a deliberate connection re-establishment in the target cell belonging to the set of cells.

15. A method as claimed in claim 14, where the received information is received from a base station of a serving cell and comprises instructions to the mobile device that when accessing a cell in the set of cells deliberate connection re-establishment shall be used.

16. A method as claimed in claim 13, wherein the set of cells comprises cells of a closed subscriber group.

17. A method as claimed in claim 1, comprising making the decision to perform the deliberate connection re-establishment procedure only if a predefined security function is activated and/or a restriction check is not prohibitive.

18. An apparatus comprising at least one processor and at least one memory including computer program code, the at least one memory and the computer program code configured to, with the at least one processor, cause the apparatus at least to,
   in a wireless communication system configured to perform a connection re-establishment procedure that is initiated by a mobile device upon an occurrence of at least one of a plurality of predefined trigger conditions, where one of the predefined trigger conditions is a detection by the mobile device of a radio link failure,
   make a decision at a control apparatus of a first access system that a deliberate connection re-establishment procedure is to be performed by a mobile device in the first access system to transfer the mobile device to another base station, where the mobile device is in connected mode in the first access system; and
   send from a base station of the first access system to the mobile device information indicative that a deliberate connection re-establishment is to be used to access at least one second access system, where
   the decision is made and the information is sent to the mobile device that in response initiates the connection re-establishment procedure regardless of the status of any of the predefined trigger conditions.

19. An apparatus comprising: at least one processor and at least one memory including computer program code, the at least one memory and the computer program code configured to, with the at least one processor, cause the apparatus at least to,
in a wireless communication system configured to perform a connection re-establishment procedure that is initiated by a mobile device upon an occurrence of at least one of a plurality of predefined trigger conditions, where one of the predefined trigger conditions is a detection by the mobile device of a radio link failure,
receive at a mobile device, from a control apparatus of a first access system, information indicative that a deliberate connection re-establishment is to be used to transfer the mobile device to another base station, the information being received at the mobile device via a base station of the first access system when the mobile device is in a connected mode in the first access system; and
process at the mobile device the received information and based on the processing, initiate a deliberate connection re-establishment procedure to access a second access system, where
the information is received and processed at the mobile device that in response initiates the connection re-establishment procedure regardless of the status of any of the predefined trigger conditions.

20. An apparatus as claimed in claim 18, comprising signalling means configured to communicate said information from a base station to the mobile device in dedicated signalling.

21. An apparatus as claimed in claim 20, wherein the dedicated signalling comprises a command for connection re-establishment in the second access system.

22. An apparatus as claimed in claim 18, comprising signalling means configured to communicate said information to the mobile device by a broadcast.

23. An apparatus according to claim 18, configured to determine if deliberate connection re-establishment in the at least one second system is desired instead of handover of the at least one mobile device.

24. An apparatus as claimed in claim 18, configured to cause insertion of at least apart of said information into or obtaining at least a part of said information from a radio resource control message.

25. An apparatus as claimed in claim 18, configured to process information comprising at least one of physical cell identity of a target cell and information of a modified access procedure.

26. An apparatus as claimed in claim 19, configured to select a target system.

27. An apparatus as claimed in claim 18, configured to process information comprising indication of a set of access systems where deliberate re-establishment procedure can be used.

28. An apparatus as claimed in claim 19, where the received information comprises information regarding a set of cells; and where the apparatus is further configured to receive an indication of a target cell; determine that the target cell belongs to the set of cells; and perform a deliberate connection re-establishment in the target cell belonging to the set of cells to access the target cell.

29. An apparatus as claimed in claim 27, wherein at least one memory, computer program code, and at least one processor are provided in a base station of a serving cell and are configured to cause the serving cell to signal instructions to the mobile device that when accessing a cell in the set of cells deliberate connection re-establishment shall be used.

30. A communication device comprising an apparatus in accordance with claim 26.

31. A base station apparatus comprising an apparatus in accordance with claim 20.

32. A computer program comprising program code means adapted to perform the steps of claim 1 when the program is run on a data processing apparatus.

33. A communication system comprising an apparatus, a communication device, base station and/or computer program in accordance with claim 18.

* * * * *